(12) United States Patent
Lee et al.

(10) Patent No.: US 7,660,945 B1
(45) Date of Patent: Feb. 9, 2010

(54) METHODS AND STRUCTURE FOR LIMITING STORAGE DEVICE WRITE CACHING

(75) Inventors: Michael M. Lee, San Jose, CA (US); Maurice L. Schlumberger, San Jose, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 801 days.

(21) Appl. No.: 10/952,981

(22) Filed: Sep. 29, 2004

Related U.S. Application Data

(60) Provisional application No. 60/551,402, filed on Mar. 9, 2004.

(51) Int. Cl.
*G06F 12/00* (2006.01)
(52) U.S. Cl. .................................. 711/113; 711/118
(58) Field of Classification Search .................. None
See application file for complete search history.

(56) References Cited

U.S. PATENT DOCUMENTS

| | | | | | |
|---|---|---|---|---|---|
| 4,593,354 | A | * | 6/1986 | Ushiro | 714/48 |
| 5,682,522 | A | * | 10/1997 | Huang et al. | 345/542 |
| 6,009,542 | A | * | 12/1999 | Koller et al. | 714/53 |
| 6,101,576 | A | * | 8/2000 | Kobayashi et al. | 711/122 |
| 6,148,368 | A | * | 11/2000 | DeKoning | 711/113 |
| 6,301,640 | B2 | * | 10/2001 | Barve et al. | 711/113 |
| 6,845,427 | B1 | * | 1/2005 | Atai-Azimi | 711/113 |
| 2001/0013085 | A1 | * | 8/2001 | Yamamoto | 711/114 |
| 2003/0229758 | A1 | * | 12/2003 | Kawamoto | 711/114 |
| 2004/0078623 | A1 | * | 4/2004 | Totolos, Jr. | 714/4 |
| 2004/0103247 | A1 | * | 5/2004 | Bita et al. | 711/114 |
| 2004/0123068 | A1 | * | 6/2004 | Hashimoto | 711/206 |
| 2004/0205296 | A1 | * | 10/2004 | Bearden | 711/129 |
| 2005/0204096 | A1 | * | 9/2005 | Shimada | 711/113 |

* cited by examiner

*Primary Examiner*—Matt Kim
*Assistant Examiner*—Ryan Dare
(74) *Attorney, Agent, or Firm*—Hensley Kim & Holzer, LLC

(57) ABSTRACT

Methods and structures for limiting the write portion of a local cache memory in one or more disk drives of a storage system such that a storage controller coupled to each may mirror the content and structure of the write portion of each disk drive. The size of the write portion of the local cache memory in a disk drive controller may be controlled by the storage controller or other host device. The size of the write portion may be controlled by switch settings to select among a plurality of predefined sizes or may be programmed by the storage controller or other host device. Programming such a size value may be by setting parameter values in a configuration page of a SCSI disk drive's local memory or may be by a vendor unique command sent by a host device to the disk drive.

9 Claims, 6 Drawing Sheets

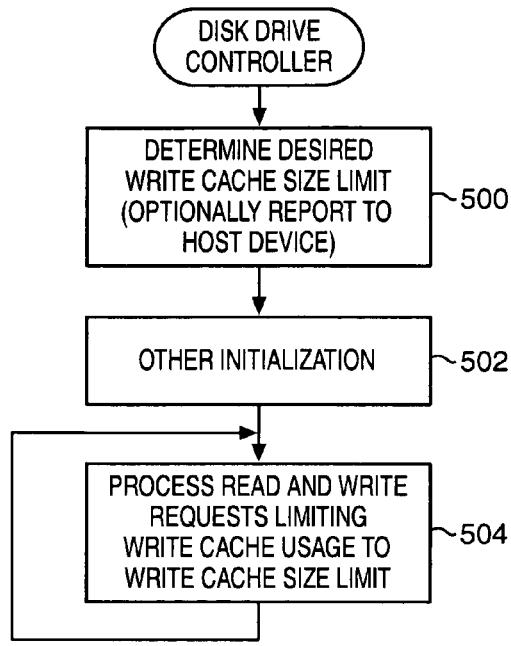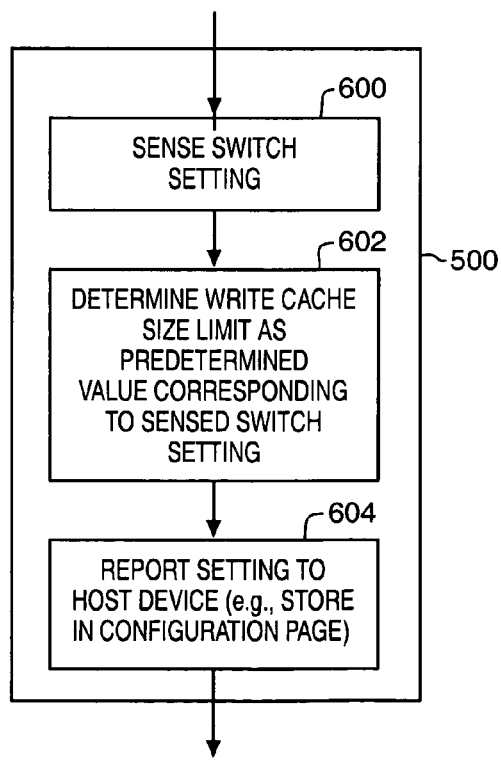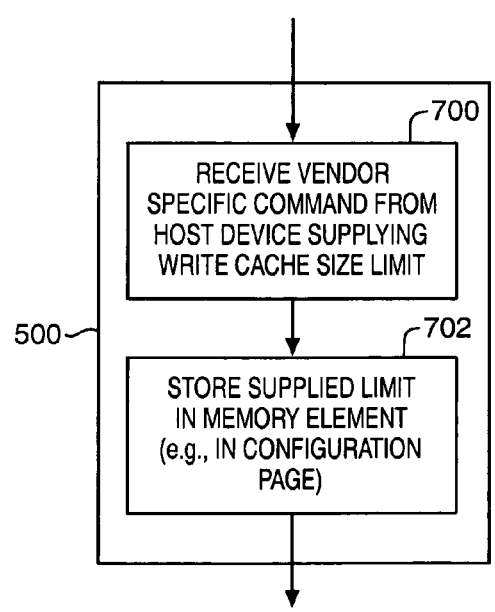

METHODS AND STRUCTURE FOR LIMITING STORAGE DEVICE WRITE CACHING

RELATED PATENTS

This application claims the benefit of U.S. provisional patent application Ser. No. 60/551,402 filed on Mar. 9, 2004 which is hereby incorporated by reference.

BACKGROUND OF THE INVENTION

1. Field of the Invention

The present invention relates generally to storage systems and in particular relates to methods and structures for assuring reliable posting of data to disk drives in a storage system by limiting write caching in the disk drive.

2. Discussion of Related Art

As computing applications have evolved to require higher capacities, performance and reliability, so to have data storage systems evolved to provide ever increasing capacity, performance and reliability. One well established and popular configuration for storage systems provides improved capacity, performance and reliability. Some such storage systems typically utilize a plurality of independent disk drives and provide a storage controller coupled to all the disk drives. The storage controller presents an interface to a host system making the multiple disk drives appear as a single, high capacity, high performance, high reliability storage device.

Numerous storage system architectures may utilize multiple disk drives logically organized into myriad different topologies. Some storage systems hide the entirety of the storage topology from the attached host systems. Some so-called network storage appliances provide a hierarchical mapping of different levels of storage capacity and performance. Transparent to the attached host systems, data may be migrated by the storage system among the various layers of storage capacities and performance. Some storage network appliances, referred to as near line storage devices, provide archival backup storage for large capacities of data. Often the archival backup storage devices are relatively slow devices such as tape drives or optical media disk drives. To an attached host system, the near line storage system may present a similar interface to a standard disk drive—a large disk with significant reliability requirements for writing data.

Still other storage systems are often referred to by the acronym RAID (redundant array of independent disks). RAID storage management techniques operable within the storage controller of the storage system map logical locations or addresses provided by host systems into corresponding physical locations in the plurality of disk drives. Further techniques within the storage controller may distribute data provided by the host system over multiple of the plurality of disk drives to improve performance and in such a manner that failure of any single disk drive in the storage system will not cause loss of data. Rather, the storage system may continue operation (though potentially in a slower, degraded mode of operation) until such time as the failed disk drive can be replaced. Such techniques are often referred to as striping and redundancy. Several configurations and techniques are well known for RAID storage systems and are often referred to by a "level" number. RAID levels may include, for example, RAID level 0 (striped), RAID level 1 (mirrored), RAID level 5 (distributed with redundancy information), etc. The various RAID levels are well known to provide different approaches for improving performance and/or reliability of the storage system. The use of multiple disks enhances performance through striping and also serves to increase the total capacity of the storage system.

For simplicity of the discussion here, storage devices, whether disk drives, optical disk devices, tape storage devices, or otherwise, may all be referred to synonymously as "disk drives" or "storage devices" regardless of the particular storage technique utilized within. All such devices may be used in storage subsystems having a storage system controller controlling overall operation of multiple storage devices such that the storage system controller presents a simpler interface to attached host systems. The simplified interface to attached host systems generally presents the collection of multiple disk drives (multiple storage devices) as a single, high reliability storage systems. Data logically addressed to the storage system is mapped to physical locations distributed in some fashion over the multiple storage devices to improve reliability, performance, or both.

In all such storage systems, a well-known technique for improving storage system performance is the utilization of cache memory. Cache memory may be provided within the storage system controller coupled to all of the plurality of disk drives or near line storage devices in the storage system. In addition, local cache memory may be provided within the local controller of each of the plurality of storage devices within the storage system. As data is written to the storage system, the host supplied data may be entered into the cache memory of the storage system controller to allow for rapid completion of the host I/O request. Such data recorded in the storage system controller's cache memory and not yet written to the disk drive (often referred to as "dirty data") is eventually written or posted to appropriate locations in the plurality of disk drives for persistent retention within the storage system. Use of the storage system controller's cache memory for temporarily recording information to be recorded is often referred to as "write caching" and the memory used for such purposes may be referred to as a "write cache". In addition, as data is read from the storage devices of the storage system it often is stored within the storage system controller's cache memory such that subsequent use of the same data may be more rapidly retrieved from cache memory rather than retrieved again from the storage devices. Such use of storage system controller's cache memory is often referred to as "read caching" and the memory used for read caching may be referred to as a "read cache". Data recorded in the write cache memory is also available for reading to more rapidly satisfy subsequent host requests for the same data.

As noted, modern disk drives also include substantial local cache memory local to the disk drive itself in addition to the above discussed cache memory in storage system controller. The local cache memory in the disk drive (typically within the disk drive controller of the disk drive) is used in communicating with a host device such as the storage controller or a host system having a storage controller integrated therein. As data is written by host system I/O requests directed to a storage system, the storage controller may store the supplied write data in its cache memory and then eventually post the information to the local cache memory of each disk drive of storing a portion of the data to be written. Since the storage controller may write information received from the host system onto multiple disk drives, each of which may include its own local cache memory used for write caching, the storage controller must provide its own sufficient write cache memory to retain information posted to each of the multiple disk drives until such time as each disk drive has verified that the information has been flushed from its own local cache memory to the corresponding locations on the persistent storage media. For example, if each of five disk drives used in a storage system has 2 MB of local cache memory that may be used to store write data, the storage controller must provide sufficient space in its cache memory for at least 10 MB of write data to be retained by the storage controller until such time as written data is known to be permanently recorded on the persistent storage media of each of the five disk drives.

As new disk drive technology has evolved, and as memory capacity and price has evolved, disk drives now possess larger and larger local cache memory structures within the disk controller of each individual disk drive. As disk drive local cache memory capacities increase, so to must the capacity for write cache memory within an associated storage controller. The memory used for local cache memory in a disk drive's disk controller is typically volatile RAM memory due to lower cost associated with a single storage device. By contrast, a storage controller in a storage system typically utilizes nonvolatile memory ("NVRAM") for its storage controller cache memory so as to prevent data loss due to power failure or other interruption. Nonvolatile memory can be substantially higher cost than volatile memories of the same capacity. It is therefore a problem for storage controller designers to effectively manage ever increasing local cache memory sizes associated with individual disk drives controlled by the storage controller. If data is forwarded from the storage system controller to multiple disk drives in a write operation, the storage controller must retain the data in its nonvolatile write cache memory until it verifies that the written data is posted to the persistent storage media of all related disk drives. The write cache of the storage controller would therefore have to be at least as large as the total size of all the write cache portions within each of the disk drive controllers. Otherwise, data may be sent to a disk drive but with no room to retain write data in the storage controller's write cache to assure that the write data is properly posted to the persistent media of the disk drives. Since the size of the local cache memory in disk drives may vary dramatically over time as disk drives evolve and may vary between vendors, storage controller designers are confronted with a constant problem of assuring that write data is never lost—especially in high reliability RAID applications.

One common technique to generally address the above discussed problem is to force frequent flushing of all write cache memories (within the storage controller and within each local cache memory of each disk drive coupled thereto) so as to assure all data is posted to the persistent storage of the disk drive of media. Another common approach utilizes special commands to force bypass of use of the local cache memory in the disk drive (e.g., a forced unit access or FUA SCSI command as typically supported by SCSI disk drives to bypass cache memory within the disk drive unit). Both of these known approaches impose performance penalties on the storage system either by never using disk drive cache memory in the case of bypass commands or by frequently forcing flushes of disk drive cache memory. In either case the disk drive persistent media may be more frequently accessed and thereby degrade performance of the storage subsystem.

To ensure that data is reliably recorded on the persistent media of the storage devices, the storage system controller keeps data stored in its non-volatile memory write cache until it can verify that the data has been flushed from the local cache memory of the individual storage devices. However, as the size of local cache memories in the disk drives increase so too must the size of the corresponding write cache memory in the storage system controller (or other host device). The storage controller designer is therefore faced with an ever changing design problem to attempt to match the size of the storage controller's cache to that of the various disk drive local cache memories or to degrade performance of the storage system by assuring that data is rapidly posted to the persistent storage media of the disk drives.

It is evident from the above discussion that a need exists for improved cache memory management in the context of storage controllers coupled to disk drives having a local cache memory.

SUMMARY OF THE INVENTION

The present invention solves the above and other problems, thereby advancing the state of the useful arts, by providing methods and structures for imposing a limit on the size of a disk drive's local cache memory portion that may be utilized for write caching functions and for mirroring the contents of each disk drive's local cache write portion in the storage system controller's write cache. In accordance with features and aspects hereof, command processing or other configuration selection features of a disk drive may establish a fixed limit for the amount of disk drive local cache memory that may be utilized for write caching operations (i.e., for the write portion size). Using such an enhanced disk drive, a storage controller coupled to one or more such disk drives may more precisely control write caching operations by having advance knowledge of the maximum caching capacity for write operations within each disk drive's local cache memory. Other features and aspects hereof segment the write cache of the storage controller such that the storage controller's write cache comprises a mirror image of the local cache memory write portion of each of the plurality of disk drives. Maintaining a complete mirror of the write portion of each disk drive's local cache memory helps assure reliability of data stored in the storage system by preventing loss of data in the volatile memory of a disk drive's volatile local cache memory. While features and aspects hereof may serve to limit the portion of a disk drive cache memory used for write caching, the entirety of the disk drive cache memory may be utilized as a read cache to improve performance in processing read operations. So limiting the size of the write portion in each of the disk drives of the storage system simplifies the use of an existing ("legacy") storage system controller in use of newer disk drives with larger local cache memory capacity. A legacy storage system controller may use a newer disk drive but limit the size of the write portion of the new disk drive local cache memory so as to obviate the need to modify the non-volatile cache memory of the legacy storage system controller.

A first feature hereof therefore provides a disk drive controller comprising: a control element for receiving I/O requests from an attached host and for processing the received I/O requests; a cache memory coupled to the control element for storing and retrieving data wherein a write portion of the cache memory is used for write cache operations; and a programmable element coupled to the control element to controllably set a predetermined limit on the size of the write portion.

Another aspect hereof further provides that the programmable element further comprises: a switch for selecting one of multiple predefined sizes as the predetermined limit.

Another aspect hereof further provides that the programmable element further comprises: a memory element for storing the current predetermined limit.

Another aspect hereof further provides that the memory element is a portion of a configuration page of the controller accessible by the host.

Another aspect hereof further provides that the memory element is accessible by the host using a vendor-unique command directed from the host to the controller.

Another feature hereof provides a storage system comprising: at least one disk drive having a disk drive controller associated therewith; and a storage system controller coupled to the at least one disk drive and coupled to a host system for processing I/O requests received from the host system, wherein the disk drive controller of each of the at least one disk drives further comprises: a cache memory for storing and retrieving data wherein a write portion of the cache memory is used by the corresponding disk drive for write cache operations; and a programmable element to controllably set a predetermined limit on the size of the write portion.

Another aspect hereof further provides that the programmable element further comprises: a switch for selecting one of multiple predefined sizes as the predetermined limit.

Another aspect hereof further provides that the programmable element further comprises: a memory element for storing the current predetermined limit.

Another aspect hereof further provides that the memory element is a portion of a configuration page of the disk drive accessible by the host.

Another aspect hereof further provides that the memory element is accessible by storage system controller using a vendor-unique command directed from the host system to the controller.

Another feature hereof provides a method operable in a disk drive controller, the method comprising the steps of: determining a write portion limit for the size of a write portion of a cache memory associated with the disk drive controller; and limiting use of the cache memory for write caching to the capacity specified by the write portion limit.

Another aspect hereof further provides that the step of determining further comprises: detecting the setting of a switch associated with the disk drive controller; and determining the write portion limit as one of a plurality of predetermined values based on the sensed setting of the switch.

Another aspect hereof further provides that the step of determining further comprises: receiving configuration information from a host defining the write portion limit.

Another aspect hereof further provides that the step of receiving further comprises: receiving a vendor-specific command from the host to define the write portion limit.

Another feature hereof provides a method operable in a system including a storage system controller having a controller cache memory and at least one disk drive each having a disk drive controller with a local cache memory, the method comprising: segmenting a write cache portion of the controller cache memory to associate a segment of the write cache portion with a corresponding write portion in the local cache memory of the disk drive controller of each of said at least one disk drive; and configuring the local cache memory in the disk controller of at least one disk drive of the at least one disk drives to limit the size of a write portion of the local cache memory to be no greater than that of the corresponding segment of the controller cache memory.

Another aspect hereof further provides that a write portion is associated with each local cache memory of each disk drive controller of each disk drive and wherein the step of configuring further comprises: configuring the size of the write portion of each local cache memory of each disk drive controller of each disk drive such that the size of each write portion of the local cache memory of the disk controller of each disk drive is not greater than a corresponding segment of the controller cache memory.

Another aspect hereof further provides that a write portion is associated with each local cache memory of each disk drive controller of each disk drive and wherein the step of configuring further comprises: reducing the size of the write portion of multiple local cache memories of the at least one disk drives such that the size of each write portion of the local cache memory of the disk controller of each disk drive is not greater than a corresponding segment of the controller cache memory.

Another aspect hereof further provides that the step of configuring further comprises: detecting the setting of a switch associated with the disk drive controller; and configuring the write portion size as one of a plurality of predetermined values based on the sensed setting of the switch.

Another aspect hereof further provides that the step of configuring further comprises: receiving configuration information from a host defining the write portion limit.

Another aspect hereof further provides that the step of receiving further comprises: receiving a vendor-specific command from the host to define the write portion size.

BRIEF DESCRIPTION OF THE DRAWINGS

FIGS. 5-7 are flowcharts describing exemplary operations within a disk drive controller enhanced in accordance with features and aspects hereof.

DETAILED DESCRIPTION OF THE DRAWINGS

Figure 1:
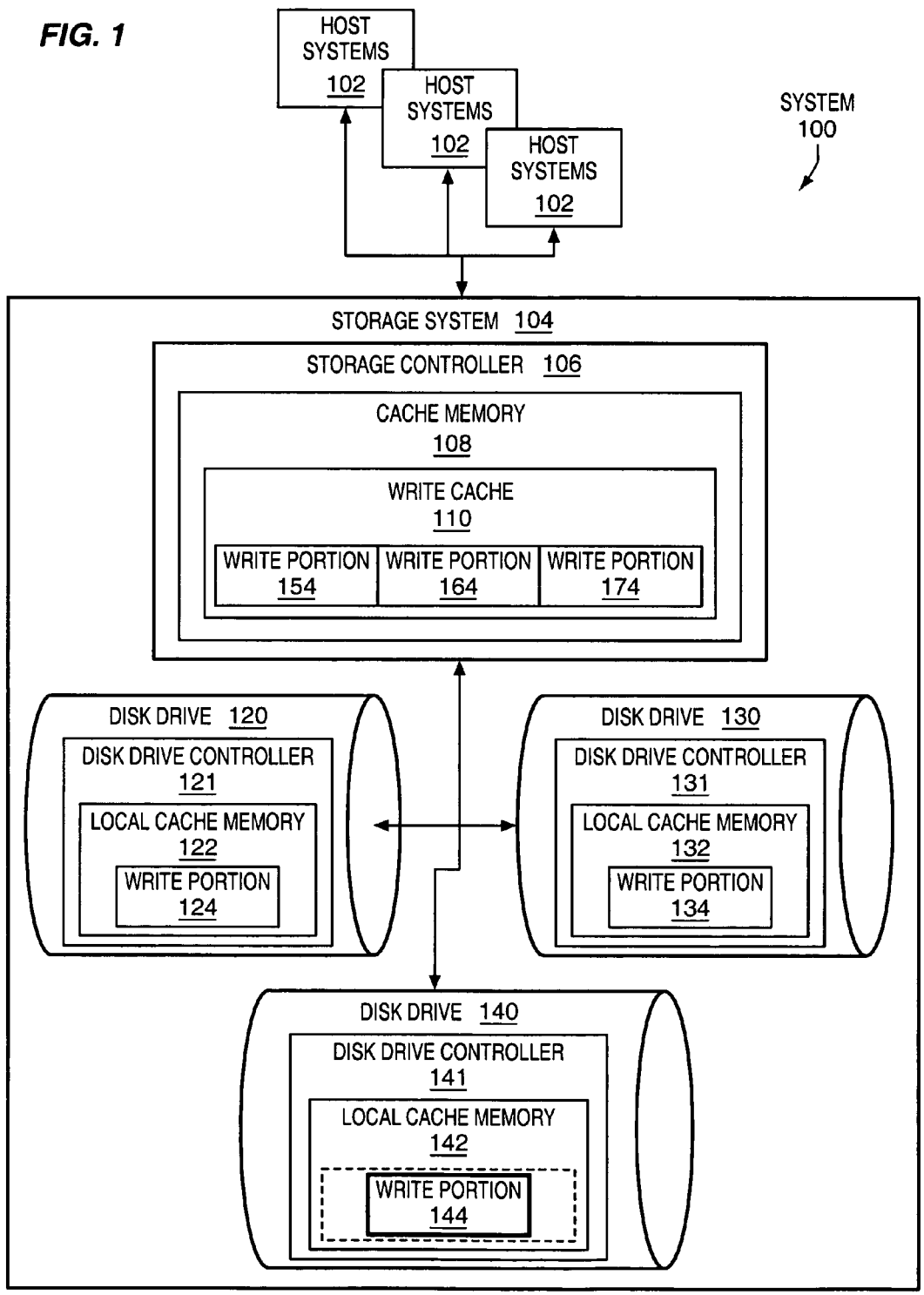
FIG. 1 is a block diagram of an exemplary storage system enhanced in accordance with features and aspects hereof to limit the write cache size in disk drives.

FIG. 1 is a block diagram of a system 100 showing a plurality of host systems 102 coupled to a storage system 104. Host systems 102 may be any personal computer, workstation or any other computing device or device utilizing storage system 104. Storage system 104 may be, for example, a RAID storage system providing high capacity, high performance, and high reliability for data storage applications. Storage system 104 may include storage controller 106 for controlling operation of storage system 104. Those of ordinary skill in the art will recognize that storage system 104 and storage controller 106 may be integrated within one or more host systems 102 or may be independent and external from any particular host system. In the latter configuration, storage system 104, via storage controller 106, communicates with host systems 102 utilizing any of several well-known communication media and protocol including, for example, parallel or serial attach SCSI, local area network ("LAN"), storage area network ("SAN"), Fibre Channel, etc.

Storage system 104 also includes one or more disk drives 120, 130, and 140 for persistent storage of data. Data to be stored in disk drives 120, 130, and 140 may be supplied by host systems 102 through write I/O operations requested by one or more of host systems 102. Further, host systems 102 may issue read I/O requests to storage system 104 to retrieve data previously stored on disk drives 120, 130, and 140. Storage controller 106 within storage system 104 receives read and write I/O requests from host systems 102, processes the received I/O requests, and controls operation of disk drives 120, 130 and 140 to perform the requested read or write operation.

As is well known in the art, storage controller 106 may be a RAID storage controller that is operable to distribute data over multiple disk drives 120, 130 and 140. Such data distribution is often referred to as "striping" of the data. Further, storage controller 106, as a RAID storage controller, may apply redundancy techniques to ensure high reliability and continued operation of storage system 104 without loss of data in response to failure of one or more of disk drives 120, 130, and 140. As is generally known in the art, storage controller 106 may comprise general and/or special purpose processing elements (i.e., CPUs, custom circuit processing components, etc.) to perform programmed instructions to control overall operation of storage system 104 and to interact with host systems 102.

Storage controller 106 may include cache memory 108 used for caching data to be written to disk drives 120, 130, and 140 and for caching read data from disk drives 120, 130, and 140. Writing data to cache memory 108 allows storage controller 106 to more rapidly report completion of a requested write operation to the requesting host system 102. Cache memory 108 is typically comprised of nonvolatile memory devices so that data written in cache memory 108 will not be lost due to power failure or certain other failures within storage system 104. In particular, data written into cache memory 108 in response to receipt of a write operation I/O request from a host system 102 causes the supplied data to be written into the write cache 110 portion of cache memory 108. Since only the write portion of the storage controller's cache memory need be nonvolatile, some storage controllers use nonvolatile memory only for the write portion and use less costly volatile memory for the remainder of the storage controller's cache memory that is used only for read operations.

Each disk drive 120, 130, and 140 may include a corresponding disk drive controller 121, 131, and 141, respectively, for controlling operation of the corresponding disk drive and for interacting with an attached host device (i.e., storage controller 106 or a directly attached host system 102). Each disk drive controller 121, 131, and 141 may also include local cache memory 122, 132, and 142, respectively for caching data read from the persistent disk storage media or to be written thereto. While the entirety of the local cache memory may be used to satisfy read requests, each local cache memory 122, 132, and 142, may include a write portion 124, 134, and 144, respectively, designated for use in write operations. The local cache memories 122, 132, and 142 may be any suitable memory devices including, for example, RAM, DRAM, SDRAM, etc. To reduce costs and complexity, the memory devices used are typically volatile memories (either static or dynamic) that may lose their respective contents due to loss of power. If a disk drive controller local cache memory uses nonvolatile memory devices, as noted above with respect to the storage controller's cache memory 108, more costly nonvolatile memory devices need only be utilized for that portion of the local cache memory that is used for servicing write requests.

As is generally known in the art, the entirety of cache memory 108 in storage controller 106 may be used to satisfy read requests from an attached host system 102. If requested data is located anywhere in cache memory 108, it may be returned to a requesting host system 102 from cache rather more slowly read from the disk drives 120, 130, and 140.

However, as noted above, problems may arise where there exists a mismatch between the size of write cache 110 used for processing write operations and the size of corresponding write portions 124, 134, and 144 in local cache memories 122, 132, and 142, respectively, in each of the plurality of disk drives 120, 130, and 140, respectively. In particular, as noted above, where the aggregate total size of the write portions (124, 134, and 144) exceeds the total cache memory size of the write cache 110 of the storage controller 106, various techniques may be required to ensure the integrity of the data at the cost of storage system performance.

Rather, in accordance with features and aspects hereof, the write portion 124, 134, and 144 of each local cache memory 122, 132, and 142, respectively, in each disk drive 120, 130, and 140, respectively, may be configured so that the total write cache 110 size of the storage controller 106 is at least as large as the aggregate size of the write portions of the local cache memories in each of the disk drive 120, 130, and 140. The size of write cache 110 may be selected in accordance with any of a number of design factors contributing to performance and reliability of storage system 104. Though this limitation is necessary, it may not be sufficient to assure data integrity. Data may be loaded into the write cache of the storage controller corresponding to data written to one of the disk drives but may exceed the size of the write portion of that disk drive. Some tracking features would then be required of the storage controller to record which of the write data has been sent to the disk drive and recorded persistently therein versus which data in the storage controller's write cache has yet to be sent to the disk drive.

Therefore, in accordance with other features and aspects hereof, not only is the total write cache size within the storage controller's cache memory at least as large as the aggregate size of the write portions of the local cache memories, but the write cache in the storage system controller may also be organized or segmented in a manner that mirrors the actual size and content of each individual write portion of each local cache memory of each disk drive. In other words, the write cache 110 of the storage system controller 106 may be comprised of a plurality of write portions 154, 164, and 174 all resident within the cache memory 108 of the storage controller 106 such that each write portion 154, 164, and 174 is at least as large as a corresponding write portion 124, 134, and 144, respectively, in one of the disk drive local cache memories 122, 132, or 142, respectively. Control processes within the storage controller 106 will assure that each of the write portions 154, 164, and 174 within write cache 110 substantially mirrors the content if not also the structure of corresponding write portion 124, 134, and 144 in the local cache memories of each disk drive.

Those of ordinary skill in the art will readily recognize that any number of disk drives may be configured within such a storage system 104 and that any number of such multiple disk drives may include configurable features to allow selective, controlled configuration of the write portion size within the disk drive's local cache memory. In particular, although reference is made frequently herein to a plurality of disk drives, it will be understood that features and aspects hereof are equally applicable to systems having but a single disk drive. Still further, those of ordinary skill in the art will recognize that storage controller 106 may be integrated within a storage system 104 as depicted in FIG. 1 or may be integrated within a particular host system 102. FIG. 1 is therefore intended merely as exemplary of one possible topology or configuration where features and aspects hereof may be beneficially applied.

Figure 2:
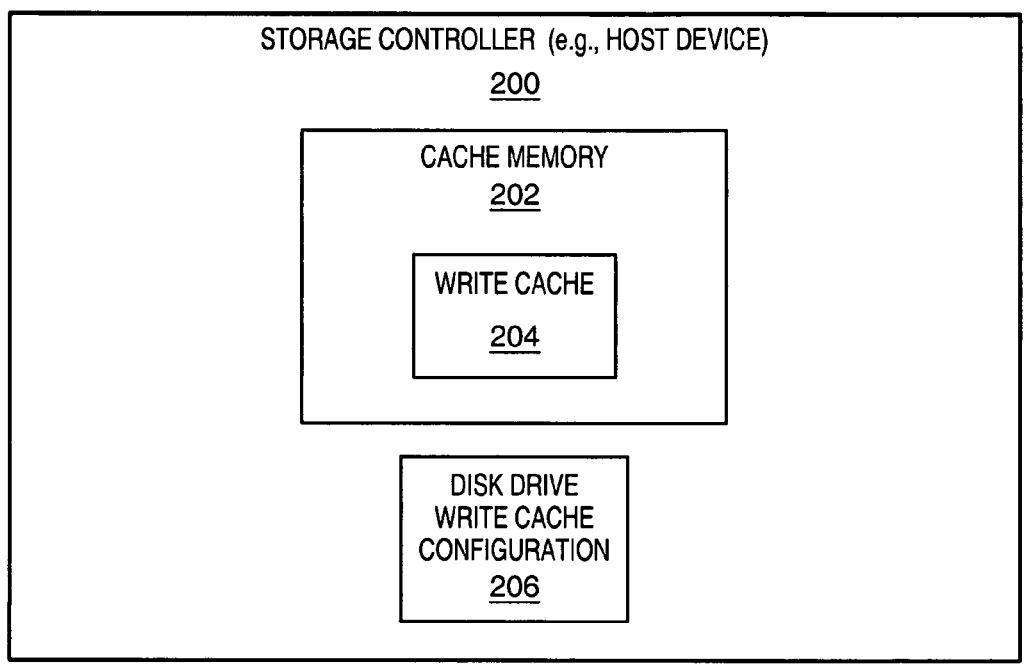
FIG. 2 is a block diagram providing additional details of an exemplary disk drive controller as in FIG. 1 enhanced in accordance with features and aspects hereof.

FIG. 2 is a block diagram showing additional details of a storage controller 200 applying features and aspects hereof similar to that of storage controller 106 shown in FIG. 1. Storage controller 200 of FIG. 2 includes cache memory 202 having write cache 204—a portion designated for storage of write data. Configuration element 206 is operable within storage controller 200 to configure the write cache portion size in one or more disk drives (not shown) coupled to storage controller 200. As noted above, operation of element 206 permits storage controller 200 to reconfigure write cache features within each disk drive coupled to a storage controller so as to ensure that storage controller's write cache may mirror write cache portions in all disk drives coupled to the storage controller. Configuration element 206 may be implemented as a matter of design choice as custom circuits and features within the storage controller 200 or as suitably programmed instructions in a general or special purpose processor (not shown) within the storage controller 200.

Figure 3:
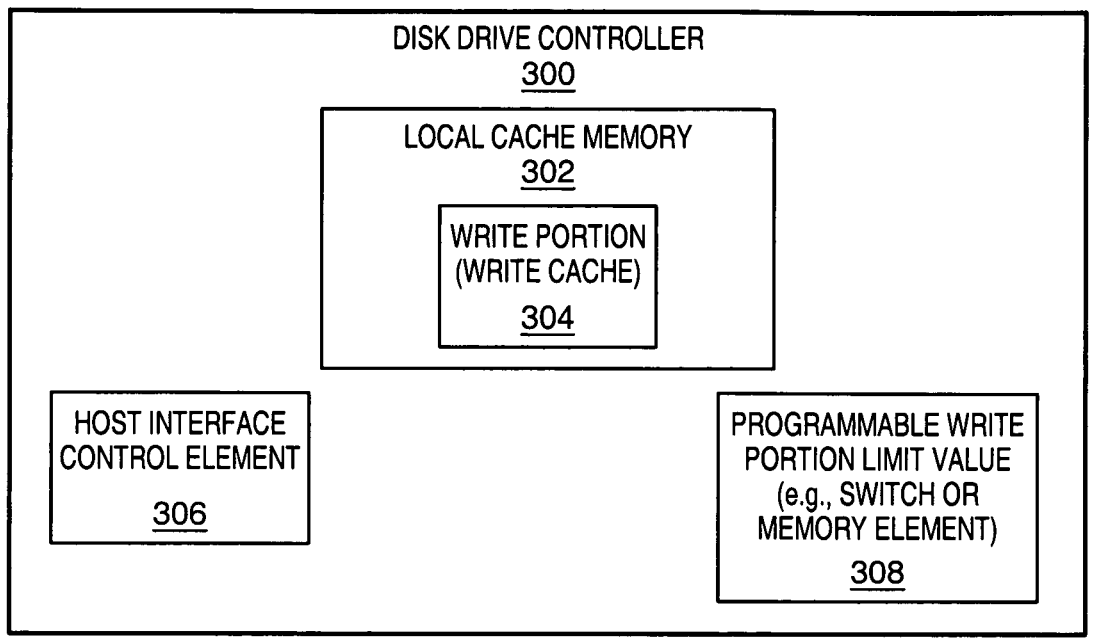
FIG. 3 is a block diagram providing additional details of an exemplary storage controller as in FIG. 1 enhanced in accordance with features and aspects hereof.

FIG. 3 is a block diagram providing additional details of an exemplary disk drive controller 300 similar to that of disk drive controllers 121, 131, and 141 of FIG. 1. Disk drive controller 300 includes a local cache memory 302 having a write portion 304 designated within and used for storing write data received from a host device such as a storage controller or host system. Host interface control element 306 is a processing element responsible for interacting with the host device (i.e., storage controller or host system) to receive and process commands and data and to return status and requested data from the associated disk drive persistent storage media (not shown).

Figure 4:
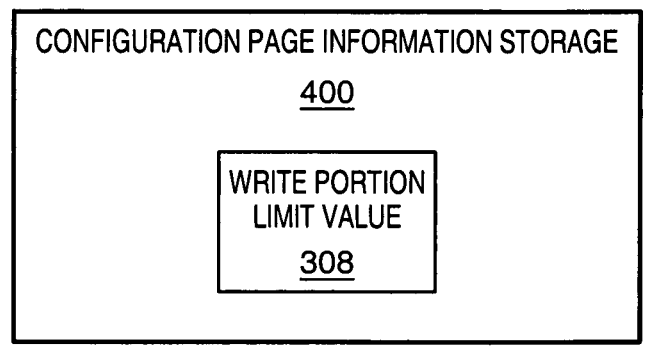
FIG. 4 is a block diagram showing an exemplary configuration page including a write cache size limit value in accordance with features and aspects hereof.

Programmable element 308 provides a limit value used to limit the size of write portion 304 within local cache memory 302 of disk drive controller 300. For example, programmable element 308 may be a switch configurable by an operator to define the write portion size limit as one of a selectable number of pre-determined sizes. Or, for example, programmable element 308 may be a memory element that stores a write portion size limit value provided by a host device (e.g., a storage controller or other host system). In particular, as shown in FIG. 4, memory element 308 of FIG. 3 may be a field in configuration page information storage element 400 storing configuration information for the associated disk drive controller in accordance with SCSI specifications and standards. Write portion size limit value 308 may therefore be stored within configuration page information storage 400. The value to be stored in write portion size limit value 308 may be supplied by a host device (e.g., a storage controller or host system) or may be entered into the memory element by the disk drive controller in response to sensing the state of a configuration switch. Those of ordinary skill in the art will recognize a wide variety of equivalent embodiments whereby a write portion size limit value is determined and configured within the disk drive of controller in accordance with features and aspects hereof.

FIG. 5 is a flowchart describing a process operable within a disk drive controller in accordance with features and aspects hereof. Element 500 is operable to determine the desired write cache or write portion size limit. As noted above, the desired limit value may be determined by interaction with a host device (e.g. a storage controller or host system) or by detecting the setting of a configurations switch. Having so determined the desired write cache size limit value, Element 502 represents any other initialization processing required to prepare the disk drive controller for normal operation. Those of ordinary skill in the art will readily recognize that the order of such initialization and the sensing of the write cache size limit value is not critical. Rather, as some part of initialization preparing for normal processing of the disk drive controller, the write cache size limit value may be sensed or determined for future utilization.

Element 504 then represents normal processing within the disk drive controller to receive and process read and write requests while applying the determined write cache limit size to limit the portion of the local cache memory utilized for write operations. Those of ordinary skill in the art will also recognize that the write cache size limit value could be dynamically altered during normal operation of the disk drive controller such that the write cache size limit may be adjusted up or down during normal operation of a disk drive controller.

FIG. 6 is a flowchart providing additional details of one exemplary implementation of element 500 in FIG. 5 operable above to determine a desired write cache size limit value. Element 600 of FIG. 6 is operable to sense a switch setting of a configuration switch associated with the disk drive controller. Element 602 then determines the write cache size limit value by translating the sensed switch setting into one of a plurality of pre-determined size limit values corresponding to the sensed switch setting. By sensing a switch setting, the disk drive controller determined the write cache size limit without interaction from a host device. Element 604 may then report the determined size limit to an attached host device (e.g., storage controller or host system). Reporting of the determined size limit may be, for example, by entering the determined size value in a configuration page of a SCSI disk drive controller such that the host device may inquire from the configuration page regarding the current setting of the write cache size limit. Those of ordinary skill in the art will recognize other implementations for reporting the sensed information back to an attached host device.

FIG. 7 is a flowchart describing an alternative embodiment implementing features of element 500 of FIG. 5 to determine a desired write cache size limit value. Element 700 is operable to receive a vendor-specific command from an attached hosted device supplying a desired write cache size limit value. The vendor-specific command may be specified by the vendor of the disk drive controller as a unique command intended to supply the desired white cache size limit value. Alternatively, the command may be a standard configuration command such as a SCSI command to provide the configuration parameters of the disk drive controller including a desired write cache size limit value. Having so received a desired write cache size limit value from a host device, element 702 is operable to store the supplied limit value in a memory element within the disk drive controller for later utilization. For example, the limit value may be recorded in a SCSI configuration page associated with the disk drive controller. Alternatively, the limit value may simply be recorded in a register or other memory element for future utilization by processes within the disk drive controller.

Figure 8:
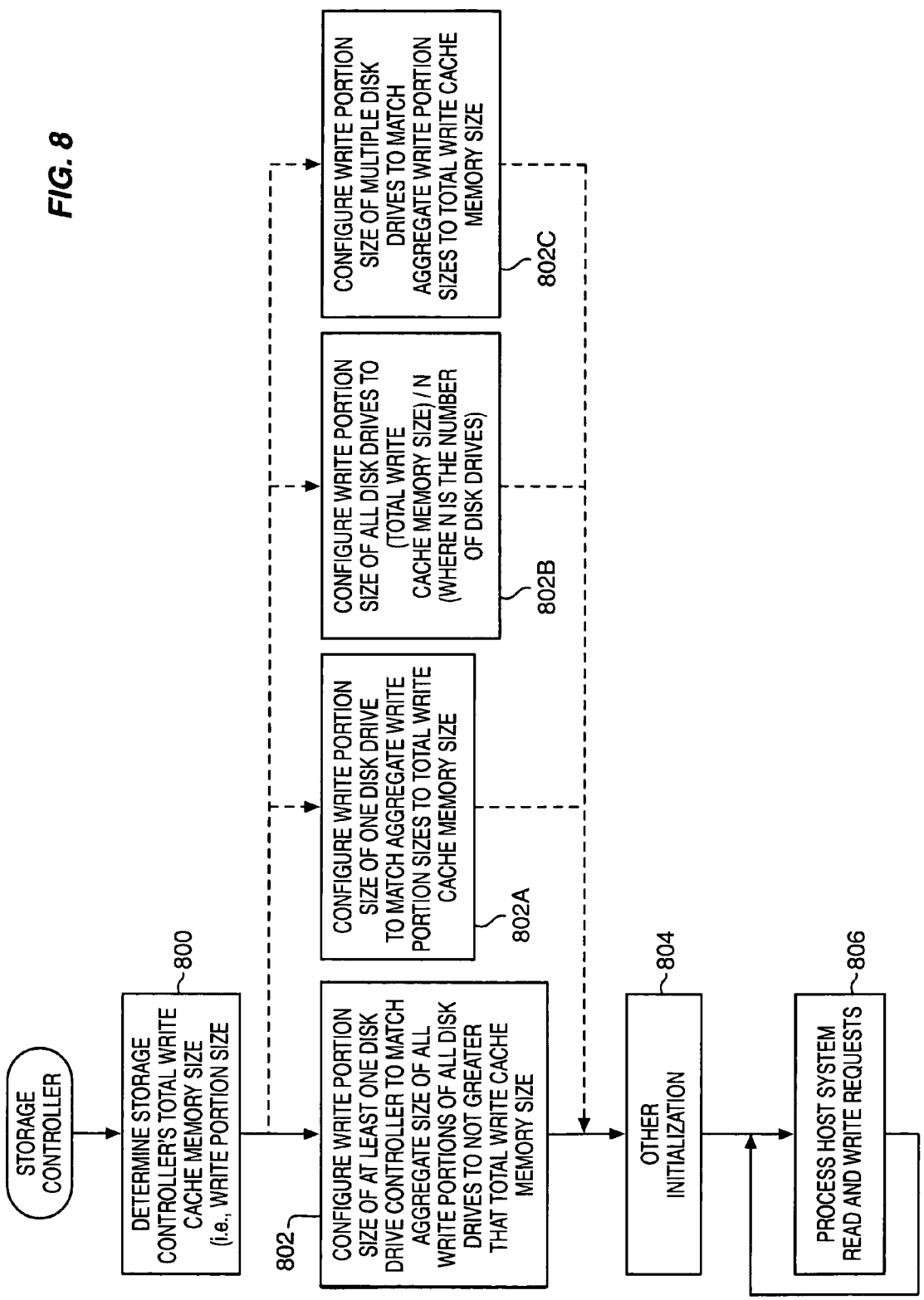
FIGS. 8-11 are flowcharts describing exemplary operations within a storage controller enhanced in accordance with features and aspects hereof.

FIG. 8 is a flowchart describing a method operable within a storage controller in accordance with features and aspects hereof. As noted above, a storage controller may be adapted to interface with and control a plurality of disk drives one or more of which is configurable to modify the size of the write cache use within the corresponding disk drive. The storage controller may determine an appropriate maximum aggregate size of all the write cache portions within all disk drives coupled to the storage controller. Specifically, the storage controller may segment its total write cache to allocate a portion corresponding to a write portion of each local cache memory of each disk drive. Each portion may then be managed as a mirror image of the contents of a corresponding write portion in the local cache memory of each of the disk drives. The storage controller may configure the write portion size of the local cache memory of one or more of the disk drives to assure that there is adequate space in the storage controller's write cache to mirror the contents of the write portion of each the local cache memory of each of the disk drives.

Element 800 is first operable to determine the storage controller's total write cache memory size. As noted above, the entire cache memory of the storage controller may be used for read operations (i.e., data available for return to an attached host system in response to the host system read request). However, only a write portion is used for storing data to be recorded on the disk drives. Since the storage controller preferably mirrors the content of each write portion in the disk drive controllers' local cache memories, one or more disk drives are configured to adjust their respective write portion sizes to assure that the storage controller has sufficient write cache memory to mirror that of each disk drive. Element 802 is then operable to configure the write portion size of one or more disk drive controllers so that the aggregate size of all write portions of all disk drives coupled to the storage controller is not greater than the total write cache memory size within the storage controller as determined by element 800. More specifically, in one aspect hereof, the write portion of each local cache memory of each disk drive is mirrored in a corresponding portion of the write cache of the storage system controller. To avoid the need to modify the size of the write cache in the storage controller, one or more of the disk drives provides configurability in accordance with features and aspects hereof to adjust the size of its local cache memory write portion. Therefore, element 802 is operable to configure one or more such configurable disk drives in the system to assure that the write cache of the storage system controller may include a write portion to mirror that of each disk drive.

Element 804 then represents any other initialization appropriate to normal operation of the storage controller. Those of ordinary skill in the art will recognize that the order of initialization is not critical to operation and that the write cache configuration operations of element 802 may be integrated within other initialization steps for the storage controller operation. Element 806 then represents continuing normal operation of the storage controller to process received read and write requests from host systems.

Elements 802-A, 802-B, and 802-C represent variants of element 802 operable to configure the write portion size of one or more disk drive controllers. Element 802-A, for example, indicates that the write portion size of a single disk drive coupled to the storage controller may be configured so that the storage controller has sufficient write cache memory to mirror its contents. For example, where a single drive in a storage system is replaced due to failure and the replacement disk drive provides a larger cache memory (e.g., due to evolved technology) the write portion size of that replacement drive may be reconfigured so as to maintain a write portion size that may be mirrored by a segment or portion within the write cache of the storage system controller's cache memory.

Element 802-B indicates that the size of write portions of all disk drives may be configured or limited by configuring the write portion size in each disk drive coupled to a storage controller. Where each disk drive coupled to the storage controller provides programmable write portion size configurability in accordance with features and aspects hereof, the storage controller may adjust the size of each disk drive as desired to permit the storage controller to effectively mirror the contents of all write portions of each of the disk drives.

Element 802-C provides yet another exemplary configuration option wherein some, but not all, disk drives coupled to the storage controller may be configured to adjust their respective write portion sizes. Where some but not all disk drives coupled to the storage controller provide configurability in accordance with features and aspects hereof, some but not all disk drives may be so configured to adjust to their respective write portion sizes to thereby assure that the storage controller may mirror the write portions of each of the plurality of disk drives.

Figure 9:
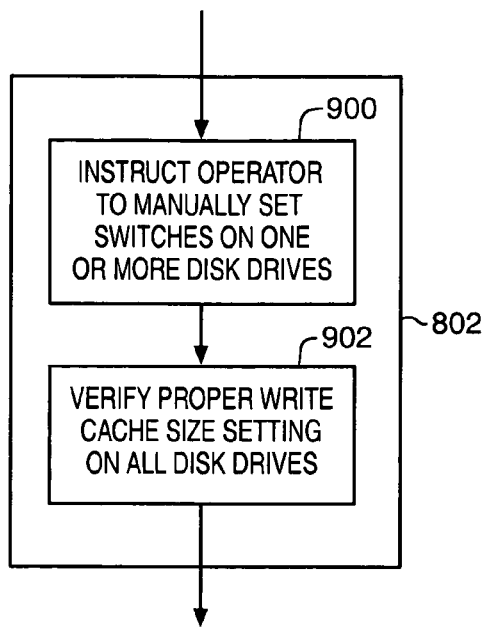
Figure 10:
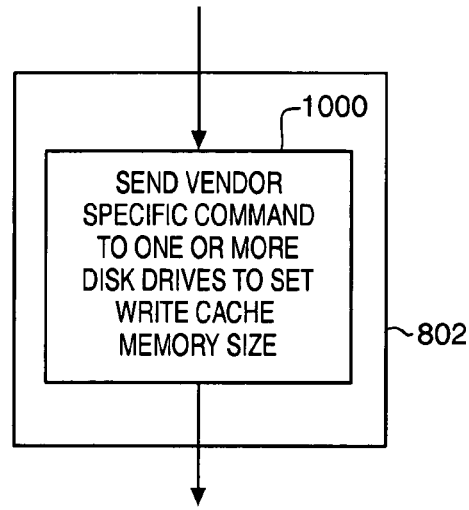
Figure 11:
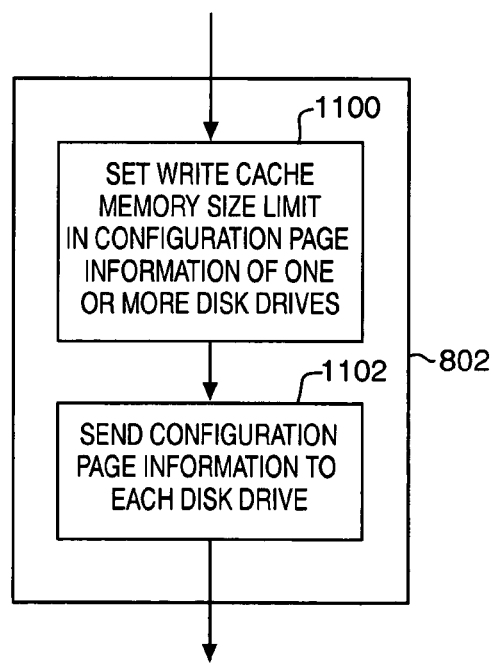

FIGS. 9 through 11 provided exemplary details for the actual process involved in configuring one or more disk drive controllers to adjust their respective write cache size limit values. In particular, element 900 of FIG. 9 indicates that the configuration may be manually performed by instructing an operator to set switches on one or more disk drives. Configuration switches may be set to select one of a plurality of predetermined write cache size limit values. In response to the manual operation to set one or more configuration switches on one or more disk drives, element 902 who may then verify proper write cache size settings on each disk drive in accordance with the instructions provided to an operator by element 900. Processing of FIG. 9 may be iterative until an appropriate configuration is sensed in each disk drive. Element 1000 of FIG. 10 presents another embodiment in which a vendor-specific command may be sent to one or more disk drives instructing the disk drive controller to configure its write cache limit size value to a value supplied in the vendor-specific command. Elements 1100 through 1102 a FIG. 11 express yet another exemplary embodiment in which a write cache memory size limit value may be encoded with in a configuration page of each of one or more disk drives coupled to the storage controller. The configuration page, with an appropriate write cache memory size limit value, may then be forwarded to each disk drive by operation of element 1102. SCSI specifications provide for vendor-specific configuration information to be exchanged between the disk drive and a storage controller. Those of ordinary skill in the art will recognize a variety of other equivalent methods and structures for effectuating the desired configuration change in the write cache memory size limit value for each of one or more disk drive coupled to a storage controller.

As noted above, in one exemplary embodiment of features and aspects hereof, the write cache of the storage controller's cache memory may be segmented in order to mirror the size, structure and content of each of the individual write portions allocated in each local cache memory of the disk drive controllers coupled to the storage controller. Well known cache management techniques are readily apparent to those of ordinary skill in the art to manage a write cache in a storage controller. In view of the above disclosed invention, such well known write cache management techniques are readily adapted to manage the write cache of the storage system controller to segment the write cache into multiple write portions each mirroring a corresponding write portion in the local cache memory of one of the disk drive controllers.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above described embodiments that fall within the scope of the invention. As a result, the invention is not limited to the specific examples and illustrations discussed above, but only by the following claims and their equivalents.

What is claimed is:

1. A method comprising:
   segmenting a write cache portion of a controller cache memory to associate a segment of a write cache portion with a corresponding write portion in a local cache memory of a disk drive controller of at least one disk drive; and
   configuring the local cache memory in the disk controller of at least one disk drive of the at least one disk drives to limit a size of a write portion of the local cache memory to be no greater than that of the corresponding segment of the controller cache memory.

2. The method of claim 1 wherein a write portion is associated with each local cache memory of each disk drive controller of each disk drive and wherein configuring the local cache memory comprises:
   configuring the size of the write portion of each local cache memory of each disk drive controller of each disk drive such that the size of each write portion of the local cache memory of the disk controller of each disk drive is not greater than a corresponding segment of the controller cache memory.

3. The method of claim 1 wherein a write portion is associated with each local cache memory of each disk drive controller of each disk drive and wherein configuring the local cache memory comprises:
   reducing the size of the write portion of multiple local cache memories of the at least one disk drives such that the size of each write portion of the local cache memory of the disk controller of each disk drive is not greater than a corresponding segment of the controller cache memory.

4. The method of claim 1 wherein configuring the local cache memory comprises:
   detecting a setting of a switch associated with the disk drive controller; and
   configuring the write portion size as one of a plurality of predetermined values based on the sensed setting of the switch.

5. The method of claim 1 wherein configuring the local cache memory comprises:
   receiving configuration information from a host defining the write portion limit.

6. The method of claim 5 wherein receiving configuration information comprises:
   receiving a vendor-specific command from the host to define the write portion size.

7. A system comprising:
   at least one disk drive having a disk drive controller and a local cache memory associated therewith; and
   a storage system controller coupled to the at least one disk drive and having one or more cache memories,
   wherein a write portion size of the local cache memory is configurable based on the one or more controller cache memories.

8. A system according to claim 7, wherein the write portion size of the local cache memory is configured such that the write portion size matches an aggregate size of the one or more controller cache memories.

9. A system according to claim 7, wherein the write portion size of the local cache memory is configured such that the write portion size does not exceed an aggregate size of the one or more controller cache memories.

* * * * *

UNITED STATES PATENT AND TRADEMARK OFFICE
CERTIFICATE OF CORRECTION

| | | |
|---|---|---|
| PATENT NO. | : 7,660,945 B1 | Page 1 of 1 |
| APPLICATION NO. | : 10/952981 | |
| DATED | : February 9, 2010 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this

Thirtieth Day of November, 2010

David J. Kappos
*Director of the United States Patent and Trademark Office*